United States Patent Office 3,354,983
Patented Nov. 28, 1967

3,354,983
METHOD AND APPARATUS FOR OBTAINING SHEAR WAVE VELOCITIES
Everett L. Erickson, Ponca City, Okla., and Jesse T. Cherry, Livermore, Calif., assignors to Continental Oil Company, Ponca City, Okla., a corporation of Delaware
Filed Jan. 18, 1965, Ser. No. 426,099
11 Claims. (Cl. 181—.5)

This invention relates generally, as indicated, to a method and apparatus for deriving shear wave velocity information from a given earth formation; and more particularly, but not by way of limitation, to a seismic process and equipment, including a unique shear wave generator, for use in well logging to obtain shear velocities in earth formations adjacent to a borehole.

The prior art reveals some teachings as to utilization of shear waves, but nothing which may be compared to the manner of operation or achievement of results as set forth herein. The presence and form of shear waves has been known for some time and it has been conceived that shear waves, when properly oriented, can be used to make determinations as to the density and stratigraphy of a particular earth formation. Some of the prior art shear wave devices have even been proposed for use in a wellbore; however, these devices have previously been restricted in use by the inability to couple the shear wave energy efficiently to the earth formation.

For the particular purpose of directly obtaining velocity information about formations immediately adjacent to a borehole, the artisans have resorted to well logging devices which employ sonic energy as the probe medium. This requires a high efficiency of energy coupling to the wall of the borehole. Some coupling fluid, such as water or the fluids normally present in a wellbore, was utilized for this coupling purpose. Such logging devices which are dependent upon the presence of a fluid or energy coupling medium have little utility along the entire depth of a borehole since, in a normal case, the hole is only partially filled with water or related fluids. The present invention resulted from efforts to obtain information about the earth formations immediately adjacent a borehole along the entire length (depth) of the borehole.

The present invention contemplates a unitary logging tool capable of shear wave generation and detection which can be passed down a borehole to derive multiple, sequential indications as to the shear wave velocity in the earth formations adjacent to the borehole. In a more limited aspect, the invention contemplates a novel magnetostrictive shear wave transducer which is compact and easily installed in a logging tool for producing either vertical or horizontal shear waves. The generated shear waves are imparted directly into the wall of the borehole from the logging tool which also comprises spaced detectors, hydraulic extenders for supporting both the transducer and detectors, and a casing containing all of the above to thus form the logging tool. Also, the invention includes control and suspension equipment for surface monitoring of results as detected by the tool in the borehole.

It is an object of the present invention to provide a logging method and apparatus for obtaining information along the entire length of a borehole.

It is another object of the invention to provide a shear wave generation and detection tool which can be employed to obtain lithologic and stratigraphic information along the entire length of a borehole.

It is a further object of the present invention to provide a magnetostrictive transducer for generating shear waves within an earth formation.

It is a still further object of the invention to provide a logging tool which can be rigidly secured anywhere along the depth of a borehole and which can then effect rigid abutment of each of the shear wave transducers and detectors of the logging tool into an energy coupling relationship with the wall of the borehole.

It is also an object of this invention to provide a logging tool having a shear wave transducer and detectors positioned in known alignment and spacing distance.

It is still another object of the present invention to employ remotely controllable hydraulic mechanisms for anchoring the logging tool in the borehole and for enabling firm coupling of all transducer and detector elements to the wall of the borehole.

Finally, it is an object of this invention to provide a logging tool which can employ either horizontal or vertical shear waves to derive localized shear wave velocity information from desired earth formations along the entire length of a borehole.

Other objects and advantages of the invention will be evident from the following detailed description when read in conjunction with the accompanying drawings which illustrate the invention.

*General*

Figure 1:
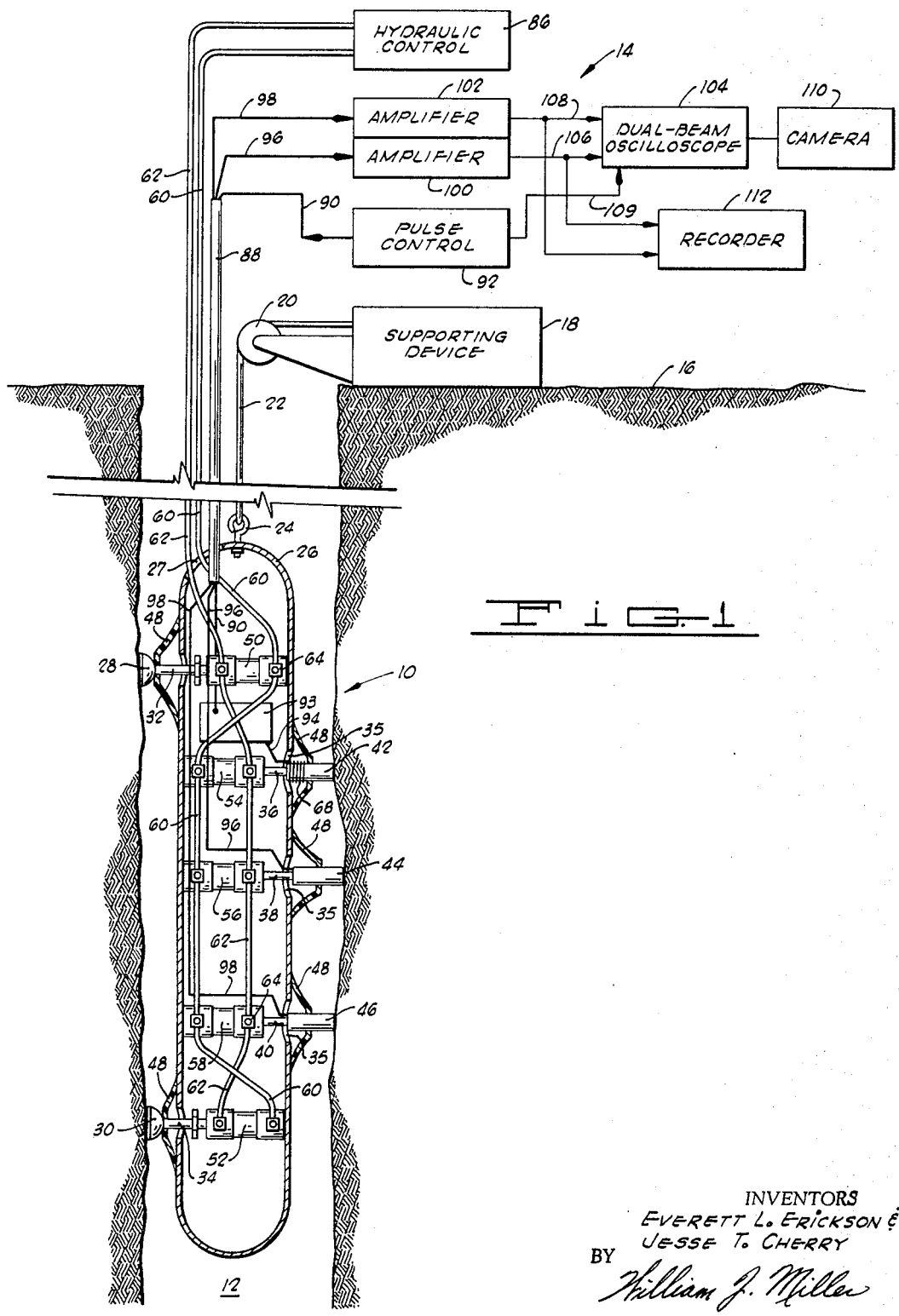
FIG. 1 is a cross-sectional diagram of the borehole logging tool in operational position and including the surface equipment in block diagram.

It is decidedly advantageous to provide a well log along the entire length (depth) of a borehole. There are various means, all well-known in the art, for providing such log indications; for example, mud logging, electric logging, radio-activity logging, etc. These types of logging equipment each have their particular utility and desirable features under varied conditions and operational requirements.

It is often desirable, to aid in a geophysical survey, to supply additional information of more precise nature about localized earth formations and strata so that interpretation of geophysical surroundings can be made more exact. This advantage may be had in many instances where an existing borehole is present within the area of the survey. It is then possible to derive log information about the local earth formations down the borehole, and this information, in turn, is applicable in the interpretation of the geophysical survey. Since the seismic survey information is present in terms of earth density and the travel time of energy through the earth, it is desirable to obtain localized log information in terms of similar parameters. Hence, it is proposed to utilize the present logging tool which enables generation of seismic waves and accurate timing of their travel through various localities (as to depth) or individual strata of earth formations adjacent to the borehole.

It is well-known to generate "compressional" (or logitudinal) waves in the earth for the purpose of measuring travel times of the energy through the various paths in the surface and substrata. This type of elastic wave is the type most often employed in seismic geophysical prospecting. However, there are other forms of elastic wave energy which for various reasons have found less extensive use in prospecting work up to this time; for example, shear waves, Rayleigh waves, and Love waves.

The compressional wave, mentioned above, is propagated through a series of compressions and rarefactions of the earth particles and the direction of the isolated particle movements is parallel to the direction of propagation. The speed of propagation is related to the density and elastic constants of the earth, and the particular behavior of the compressional wave makes it most desirable for seismic prospecting.

Another type, "shear" waves, are generated by a shear force and induce an elastic wave which causes isolated particle movement (compression and rarefaction) which is transverse to the direction of propagation. These waves may be polarized further (the third dimension) as to the transverse direction such that if the plane of particle movement is normal to the earth's surface, the waves are said to be vertical shear waves (SV), and when the plane of particle motion is parallel to the earth's surface, the waves are termed horizontal shear waves (SH). Shear waves (both SV and SH) are affected by the density and elastic constants of an earth formation such that the propagation velocities of shear waves will always be less than the velocity of a compressional wave by a known factor which is a function of the elastic constants of the earth medium. Thus, shear wave test data is directly applicable in determinations as to compressional wave survey results.

Hence, by obtaining a series of shear wave travel time measurements along the depth of a borehole, it is possible to obtain more accurately the information as to the density and elastic constants of each individual strata underlying the survey area. This information further enhances the possibilities of more accurate interpretation of compressional wave or other surveys throughout the area and provides applicable information in similar parameters.

This invention proposes the use of seismic waves of a type which can be easily and efficiently generated under the limited space conditions and can still render accurate timing indications. Vertical (SV) or horizontal (SH) shear waves are generated and induced into the earth by a novel magnetostrictive transducer (to be fully described) whereupon detection means of known spacing, also located in the logging tool, generate indications which can be further processed to yield time measurements or other related parameters.

*Detailed description*

FIGURE 1 illustrates the logging tool 10 as it is positioned for operation in a borehole 12. The control and data utilization equipment 14 is located at the surface of the earth 16 in operative position to the borehole 12. A suitable supporting device 18 having a pulley 20 or other equivalent apparatus operates to lower the logging tool 10 down into the borehole by means of the supporting or lowering cable 22. The supporting device 18 should include suitable length metering means for accurately indicating the length of the cable 22 which has been lowered into the borehole. Thus, the depth of the logging tool 10 down the borehole can be accurately logged at all times through an operation.

The lowering cable 22 is attached at the eye 24 to the casing 26 of the logging tool 10. Casing 26, a cylindrical enclosure, forms the body for containing the operative elements of the logging tool. The casing 26 includes an aperture 27 at the top and suitable sealing means (not shown) for allowing entry of the control conduits into the logging tool 10 as will be described.

The rigid positioning of the logging tool in the borehole may be effected by suitable hydraulic means, a particular form of which will be described below. On one side of the logging tool vertically spaced pusher feet 28 and 30 are supported by hydraulic piston rods 32 and 34, respectively, as will be more fully described, the rods 32 and 34 can be extended to move the feet 28 and 30 into connecting relationship with the sides of the borehole 12 under the control of the surface operator. Three apertures 35 are provided in the casing 26 at the other side of the logging tool 10 to accommodate three hydraulic piston rods 36, 38 and 40. The hydraulic rod 36 supports a transducer or shear wave generating head 42. The hydraulic rods 38 and 40 support detector devices 44 and 46 respectively. Each of the hydraulic rods 36, 38 and 40 can be extended under hydraulic control similarly to rods 32 and 34 of the pusher feet 28 and 30 to place the respective sounding elements, that is, transducer 42 and detectors 44 and 46, firmly against the side wall of the borehole. Flexible watertight skirts 48 are provided to sheathe each piston rod opening in the casing 26 to prevent the entry of borehole fluids or other material into the logging tool.

Each of the hydraulic piston rods 32, 34, 36, 38 and 40 is controlled in conventional manner by hydraulic cylinder devices 50, 52, 54, 56 and 58, respectively. Hydraulic control lines 60 and 62, lowered from the surface control area, are led down and through the aperture 27 in tool casing 26; whereupon they are attached in parallel to the hydraulic cylinders 50, 52, 54, 56 and 58. It should be noted that each of the hydraulic lines 60 and 62 is connected in the same manner to each of the hydraulic cylinders, such that simultaneous operation can be achieved during the positioning operation. Suitable T-connections 64 would be provided at each cylinder connection for attachment to the lines 60 and 62.

It should be understood that other equivalent hydraulic positioning mechanism may be readily substituted. For example, the hydraulic cylinder devices 50, 52, 54, 56 and 58 could be connected in parallel to a self-contained hydraulic system located within the tool casing 26. Surface control could then be effected by conventional electrical apparatus and thus the bulk of connecting devices down the borehole could be reduced. The obvious advantages would be in the elimination of problems which are inherent with extended hydraulic control lines.

Figure 2:
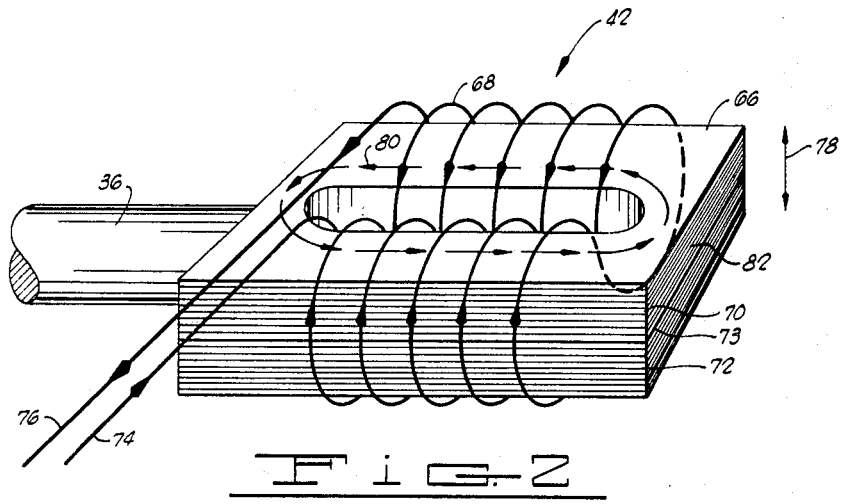
FIG. 2 illustrates the magnetostrictive transducer in a perspective view.

The generation of shear wave energy at the transducer 42 is effected by a novel type of magnetostrictive shear wave generator. Referring now to FIG. 2, there is shown a form of such a magnetostrictive generator or transducer. The transducer 42 comprises an annular-shaped core 66 which is rigidly attached to the hydraulic cylinder rod 36, and an excitation winding 68 which is attached to suitable energization equipment as will be described.

The core 66 is made up of two groups of laminations. A first group 70 is formed from a material which exhibits negative magnetostriction. Pure nickel laminations have been used in group 70 and these have the property such that upon introduction or exposure into a magnetic field, the material will contract. The second or lower group 72 of laminations are formed from a material which exhibits positive magnetostriction. We have used forty-five (45) percent nickel-iron alloy for the laminations in group 72. This material exhibits positive magnetostriction and is characterized by the fact that upon introduction into a magnetic field it expands. The individual laminations of each of these groups, the nickel and the alloy groups 70 and 72, are strongly bonded together and the two groups 70 and 72 are then further bonded together as shown at line 73. A strong bond can be assured by conventional bonding practices; whereupon the energizing winding 68 is then coiled about the core in the manner shown in FIG. 2.

Upon introduction of electrical energy to the winding 68 by leads 74 and 76, magnetic flux is generated within the core 66 to thereby excite both groups 70 and 72 of the magnetostrictive laminations. This simultaneous energization, with the resulting expansion and contraction of the two groups of metal laminations, results in a phenomena known as the transverse effect to give a movement as shown by the arrow 78. With electron flow as shown, that is, with the electrons flowing in through lead 74 and out of the coil 68 through lead 76, the flux path will be as shown by the arrows 80, and the direction of resulting transverse motion will be as shown by the arrows 78. Thus, when the end surface 82 of the core 66 is placed against an object, such as the wall of the borehole, and suitable electrical energization is introduced through leads 74 and 76, the resulting vibration energy at end surface 82 will generate a shear wave within the earth formation. This resulting shear wave can be either the SV or the SH type of generation, depending upon how the transducer or core 66 is aligned with respect to the wall of the borehole. That is, the direction or plane of transverse motion 78 may be either vertical or horizontal, as will be further described.

As indicated above, the lower group 72 of laminations are preferably of a material exhibiting positive magnetostriction. However, it should be understood that the group 72 of laminations could be formed of a diamagnetic material (such as brass or copper) which does not exhibit magnetostriction, but, relatively speaking, the over-all transverse effect of the transducer will be reduced.

Returning again to FIG. 1, it will be noted again that the detectors 44 and 46 are supported on hydraulic rods 38 and 40, respectively, for movement into firm contacting relationship with the borehole wall. The detectors 44 and 46 are preferably of the piezoelectric type. For operation in the SV mode the detectors can be normal piezoelectric elements; however, when it is desired to operate in the horizontally polarized or SH mode it would be preferable that the detector elements should be sensitive primarily to the transverse particle motion. One suitable type of horizontal detector is the shearplate type piezoelectric transducer.

The detectors 44 and 46 are so placed within the logging tool 10 that their precise distance apart is a known value. Thus, measurement of the travel time of shear wave energy from the generator 42 to the detector 44 and then the detector 46 will be equitable to a known earth density since the distance of travel is precisely known.

The surface control equipment consists of a suitable hydraulic control 86 connected to control the hydraulic lines 60 and 62 for positioning or firming the logging tool 10 in the borehole. This is conventional hydraulic control whereby the regulation of the pressure differential between the lines 60 and 62 will act to position the hydraulic pistons (not shown) within the cylinder mechanisms 50, 52, 54, 56 and 58.

The electrical connections are made between the surface equipment and the logging tool by a conduit 88. The conduit 88, leading down and entering the tool casing 26 at the aperture 27, contains a first lead 90 from a pulse control 92 which conducts the shear wave generating signals down to the logging tool 10. Thus, the lead 90 extends down the cable 88 and connects to a pulsing circuit 93 which in turn connects to the excitation coil 68 of the shear wave transducer 42 via the lead 94. The pulsing circuit 93 is a suitable reactance device for delivering a high intensity control pulse. An alternative circuit has also been constructed wherein the pulsing circuit 93 is a continuously running, repetitive trigger device. With this embodiment it is only necessary to conduct a timing pulse up the cable 90 for use in synchronizing the dual beam oscilloscope 104.

The additional leads 96 and 98 each extend from connection with the detectors 44 and 46, respectively, up through the cable 88 to the surface equipment where they are connected to the respective amplifiers 100 and 102. After amplification, the detected signals are then applied to a dual beam oscilloscope 104 by means of leads 106 and 108. The oscilloscope 104 is synchronized by means of a timing pulse applied from pulse control 92 on lead 109. The dual beam presentation on oscilloscope 104 will then enable visual representation of the time difference in the two detected signals. Since the physical distance between detector 44 and detector 46 is precisely known, the presentation of oscilloscope 104 can be calibrated to give a direct indication of shear velocity or other related information. A camera 110 is shown in optical relationship for recording the dual beam traces on oscilloscope 104. Also, in some instances it may be desirable to maintain other permanent recording as shown by the provision of recorder equipment 112.

In actual practice, the various control lines such as the supporting cable 22, the electrical conduit 88, and the control lines 60 and 62 would probably be contained in a single armored cable of suitable design for ease of handling and operation. It should be understood that the piston rod 36 and transducer 42 should be adjustable to the extent that a ninety degree rotational movement can be made to allow for either SH or SV operation, depending upon the desire of the operator of the tool.

*Operation*

When it is desired to run the shear wave log to determine the density and approximate composition of earth formations along the entire borehole (depth), it is necessary to periodically lower the logging tool 10 by means of the supporting device 18 and, in between each such period, exercising hydraulic control from the control 86, such that the logging tool 10 is firmly positioned in the borehole 12. At each position, or reading interval, the shear wave can be generated by means of pulse control 92 or other analogous control means, then the return signals, as picked up by detectors 44 and 46, are amplified and placed on the dual beam oscilloscope 104. This procedure of reading can be carried out along the entire depth of a borehole, and at any intervals whereby it is determined that an effective log of the borehole should be made.

Assuming that the logging tool 10 is in a position in the borehole where a reading has just been made, the hydraulic control 86 is actuated so that each of the hydraulic cylinders 50, 52, 54, 56 and 58 is caused to retract its respective piston rod 32, 34, 36, 38 or 40. In this condition, the pusher feet 28 and 30, the transducer 42, and the detectors 44 and 46 are drawn in next to the casing 26, their innermost positions. The supporting device 18 is then actuated to pay out a prescribed amount of cable 22, depending upon the reading intervals, such that the logging tool 10 is repositioned at a new depth in the borehole 12. This repositioning will be in accordance with the pattern of the log as determined for the particular locale and type of information desired.

At the new depth, the hydraulic control 86 is oppositely actuated to extend each of the piston rods 32, 34, 36, 38 and 40 by so controlling the fluid pressure differential within the respective cylinders 50, 52, 54, 56 and 58. As the piston rods are extended, each of the pusher feet 28 and 30, the transducer 42 and the detectors 44 and 46 will be forced into firm, contacting relationship with the sides of the borehole, casing, or whatever. When the logging tool is firmly lodged in its position a new sounding can be made.

The operator stationed at the surface console can then actuate the pulse control 92 through the connection 90 and conduit 88 down to the logging tool 10 to energize the pulsing device 93. The pulsing device 93 energizes the excitation winding 68 to actuate the transducer 42 and thus generate a shear wave. The shear waves are imparted into the earth and travel in all directions. However, the path which we are concerned is that leading downward from the transducer 42 past the detector 44 and then the second detector 46. Each of the detectors generates an electrical indication when the shear wave passes its position, and each sends its electrical indication up through the respective cables 96 and 98, through the conduit 88, and finally to the respective amplifiers 100 and 102 located in the surface equipment. The detected and amplified signals are then applied via leads 108 and 106 to separate inputs of the dual-beam oscilloscope 104. Due to the fact that the detectors 44 and 46 are spaced a known distance apart, and the fact that the entire system is on a common time base, the dual trace representation on the oscilloscope 104 can be made to read directly the time difference of the shear wave as detected at detector 44 and the detector 46. The indication can be recorded by a camera, for example, a Polaroid Land camera, as shown by numeral 110. It is also contemplated that other recorder means 112, such as other conventional geophysical log-type recorders, can be employed simultaneously in lieu of the camera 110.

It is contemplated that either type of shear wave, that is, the SV or SH shear wave, can be employed for the log readings. As previously indicated, this can be effected by rotation of the shear wave generator 42 at one extreme or the other of a ninety degree arc. That is, if the generator 42 is firmly embedded in the borehole wall with the transverse force 78 (FIG. 2) oriented in a direction parallel to the surface of the earth and/or the majority of earth's strata, then it can be said that an SH shear wave is generated. This shear force will be propagated as a manifestation of alternating transverse particle motion past the detector 44 and the detector 46. It should be understood that the shear waves generated at the point of contact of generator 42 will travel in all directions, however, we are only concerned in this application with the path from transducer 42 past the detector 44 and then the second detector 46, such that a time measurement can be read.

Figure 3A:
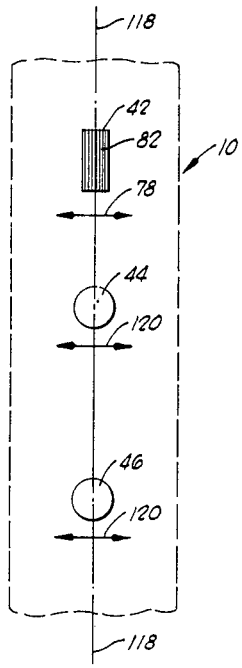
FIGS. 3A and 3B are functional views of the shear wave generation and detection system for two different modes of operation.
Figure 3B:
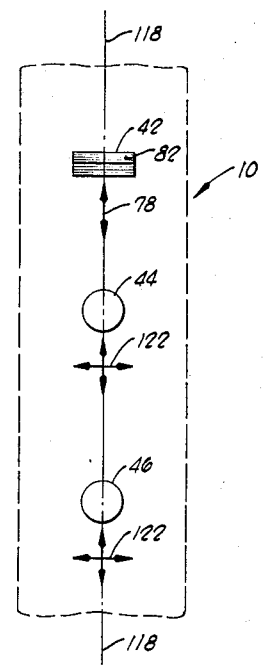

By rotating the transducer 42 ninety degrees, such that the generated shear force 78 (FIG. 2) is in-line with the profile of transducer 42 and detectors 44 and 46, a vertically polarized or SV type shear wave is generated. This SV type of wave can also be used for obtaining log information about the earth formations adjacent the borehole. FIGS. 3A and 3B show the two types of shear wave orientation.

FIG. 3A shows the arrangement wherein SH waves are utilized, that is, the transducer 42 is oriented so that its transverse motion 78 is horizontal or transverse to the source-to-detector line 118. This generates horizontal particle movement within the earth formation which travels past each of detectors 44 and 46 to induce representative electrical potentials therein. The detectors 44 and 46 of the transverse (FIG. 3A) operation should be a type which are primarily responsive to the horizontal or transverse shear disturbances as denoted by the arrows 120. One preferred type for use in SH detection would be the shear-plate type of piezoelectric transducer. This is a known and commercially available type of geophone which is particularly adapted for SH wave pick-up.

FIG. 3B shows the alternative mode of operation wherein the generated shear wave is in-line with the source-to-detector profile. In this case the shear wave generator 42 is oriented so that its transverse force (shown by arrow 78) is induced parallel to the source-to-detector line 118. This results in utilization of what is termed the SV wave (vertical shear) and the detectors 44 and 46 receive their indications in the same manner as before. With the SV or in-line type of shear wave generation, however, it will be possible to record compressional, SV type shear, and Rayleigh waves at the detectors 44 and 46. If any two of the above three types of waves (due to the SV generation at transducer 42) are identifiable on the records, this is sufficient to determine the elastic properties of the earth medium. Thus, in this alternative mode of operation, the detectors 44 and 46 should be of the conventional piezoelectric type having approximately equal response sensitivity to both transverse and in-line disturbances as shown by arrows 122.

When generating the in-line shear or SV wave as diagrammed in FIG. 3B, the wave energy apparent across the non-polarized detectors 44 and 46 will contain compressional, shear and Rayliegh waves, and also, they will be in that respective order due to their comparative velocities. The earth medium will govern the amounts of attenuation of the respective wave types, but generally two out of three types will be detectable in sufficient amplitude. Thus, the surface recorder can be read to determine the desired wave velocity by matching or interpolating between the series of waves detected at each detector to thereby derive a common event which can then be used to derive travel time between the two spaced detectors.

Thus, it should be apparent that the specification sets forth a novel method and apparatus for determining earth density and elasticity information for further use in seismic survey work. Given this information as to the varying strata along an existent, or an especially drilled, borehole, the accuracy and reliability of a survey interpretation for the entire area can be much enhanced. The device employs a novel magnetostrictive shear wave transducer which can impart either SV or SH type shear waves to an earth formation. These shear waves can then be timed with great accuracy, due to the fact that pre-spaced detectors are used, and the derived information can yield useful and direct survey information. Further, as an aid to versatility of the invention, hydraulic positioning means are utilized to (i) provide solid footing or support to the sides of the borehole, and (ii) provide solid abutment or engagement of the energy transducer and detectors to the wall of the borehole. Thus, the logging tool is capable of taking a reading anywhere along a borehole or casing and employs contact coupling within the wall of the casing or hole so that no fluid or other coupling medium is necessary.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:
1. Apparatus for obtaining shear wave velocity in an earth formation, comprising:
   means for generating a shear wave in the earth formation; said means comprising:
      a first group of mutually bonded laminations which exhibit positive magnetostriction;
      a second group of mutually bonded laminations which exhibit negative magnetostriction, said second group being bonded to said first group along an abutting surface therebetween; and
      means for producing a magnetic field around said first and second groups;
   first means for detecting wave energy in the formation;
   second means for detecting wave energy in the formation which is aligned with the generating means and said first means and is a known distance from said first means; and
   means for measuring the travel time of the wave energy between said first and second means.
2. Apparatus as set forth in claim 1 wherein:
   said first and second groups exhibiting magnetostriction are arranged to generate vertical shear waves in the formation.
3. Apparatus as set forth in claim 1 wherein:
   said first and second groups exhibiting magnetostriction are arranged to generate horizontal shear waves in the formation.
4. The apparatus as set forth in claim 1 wherein said means for producing a magnetic field comprises:
   coil means disposed around said first and second means exhibiting magnetostriction; and
   circuit means providing a pulse output to said coil means.
5. Apparatus for obtaining information about an earth formation traversed by a borehole comprising:
   casing means to be lowered in a borehole;
   shear wave generating means carried by the casing means and adapted to impart shear waves to the earth formation, said means comprising:
      a first group of mutually bonded laminations which exhibit positive magnetostriction;

a second group of mutually bonded laminations which exhibit negative magnetostriction, said second group being bonded to said first group along an abutting surface therebetween; and means for producing a magnetic field around said first and second groups;

first detecting means carried by said casing means and adapted to be placed in contact with the earth formation;

second detecting means carried by said casing means and adapted to be placed in contact with the earth formation a known distance from said first detecting means; and means for measuring the time interval between shear wave energy arrivals at said first and second detecting means.

6. Apparatus as defined in claim 5 wherein said shear wave generating means and first and second detecting means are extended from one side of the casing means, and characterized further to include means extended from the opposite side of the casing means for forcing said shear wave generating means and first and second detecting means against the wall of the borehole.

7. Apparatus as defined in claim 6 wherein said shear wave generating means and first and second detecting means are aligned vertically along the casing means.

8. Apparatus as defined in claim 6 wherein said means extended from the opposite side of the casing means includes:

at least one hydraulic cylinder in the casing means;
a piston rod extended from each hydraulic cylinder through said opposite side of the casing means;
a pusher member carried by each piston rod and adapted to engage the wall of the borehole; and
means for actuating each hydraulic cylinder from a remote location to extend and retract the piston rod from the respective hydraulic cylinder.

9. Apparatus as defined in claim 8 wherein two vertically spaced hydraulic cylinders are carried by the casing means; and wherein said shear wave generating means and first and second detection means are vertically aligned on the casing means.

10. Apparatus as defined in claim 9 characterized further to include a hydraulic cylinder and associated piston rod carried by the casing means and supporting each of said shear wave generator and first and second detection means, and means for actuating each of said last-mentioned hydraulic cylinders from a remote location.

11. Apparatus as defined in claim 10 wherein said means for actuating all of said hydraulic cylinders comprises a hydraulic control connected to all of said hydraulic cylinders in parallel for simultaneous extension and retraction of all of said piston rods.

References Cited

UNITED STATES PATENTS

| | | | |
|---|---|---|---|
| Re. 25,928 | 12/1965 | Geyer et al. | 181—.5 |
| 2,782,280 | 2/1957 | Bickford | 310—26 |
| 2,892,501 | 6/1959 | Boller | 166—100 |
| 2,943,694 | 7/1960 | Goodman | 181—.5 |
| 3,007,063 | 10/1961 | Harris | 340—11 |
| 3,061,037 | 10/1962 | Evans | 181—.5 |
| 3,208,549 | 9/1965 | Alexander et al. | 181—.5 |
| 3,213,358 | 10/1965 | Piety | 181—.5 |

SAMUEL FEINBERG, *Primary Examiner.*

BENJAMIN A. BORCHELT, *Examiner.*

W. KUJAWA, *Assistant Examiner.*